United States Patent [19]

Clark et al.

[11] Patent Number: 4,598,179

[45] Date of Patent: Jul. 1, 1986

[54] TELEPHONE PRIVACY SYSTEM

[75] Inventors: Lloyd E. Clark, Millersville; Ralph E. Emery, Edgewater, both of Md.

[73] Assignee: Sakura Telecommunications, Inc., Millersville, Md.

[21] Appl. No.: 625,825

[22] Filed: Jun. 28, 1984

[51] Int. Cl.$^4$ ............................................. H04M 15/06
[52] U.S. Cl. .................... 179/84 C; 179/84 T; 179/84 VF
[58] Field of Search ............... 179/84 R, 84 C, 84 SS, 179/84 T, 84 VF, 5.5, 84 A, 84 L, 2 A, 18 BF, 99 P, 18 FH

[56] References Cited

U.S. PATENT DOCUMENTS 4,121,053 10/1978 Dick ..................................... 179/2 A
4,266,098 5/1981 Novak ............................ 179/84 C X Primary Examiner—James L. Dwyer
Attorney, Agent, or Firm—Epstein & Edell

[57] ABSTRACT

A telephone privacy system provides audible melodies identifying respective authorized callers without requiring the system user to answer the phone. A first ringing signal burst on the user's telephone line actuates the telephone ring circuit to announce an incoming call. The second burst places the phone off-hook and returns simulated audible ringing signal to the line so that unauthorized callers are not aware that calls are being screened. The simulated audible ringing signal also serves as an entry request to authorized callers who dial in their identification code after the first burst of simulated audible ringing signal. The entered code activates a tune generator to provide the called party with the caller-identifying melody. A visual indicator is provided to register visible indicia representing authorized calling parties.

19 Claims, 5 Drawing Figures

TELEPHONE PRIVACY SYSTEM

BACKGROUND OF THE INVENTION

1. Technical Field

The present invention relates to telephone privacy systems and, more particularly, to systems which automatically distinguish authorized callers from unauthorized callers.

2. Discussion of the Prior Art

Telephone privacy and screening systems are well known in the prior art. The primary utilization of such systems is to inform a telephone subscriber or user that an authorized caller is attempting to call, in which case the subscriber can answer the call or not as he or she sees fit. Some prior art systems, such as that disclosed in U.S. Pat. No. 3,514,548 (DeMeo), inhibit ringing at the subscriber's transmitter/receiver set unless an authorized or desired call is being received. The DeMeo system responds to all calls by mechanically lifting the system user's handset off its cradle. If the caller enters the proper code, the phone is caused to ring, notifying the subsciber or system user that an authorized caller is on the line. If a proper code is not dialed by the caller, the handset is returned to the on-hook position after a pre-set time interval. While this system performs its intended function, it responds to only one caller code and is therefore able to distinguish between authorized and unauthorized callers but cannot identify individual authorized callers. Moreover, since the handset is lifted off hook without further response on the telephone line, an unauthorized caller is made aware that some sort of screening process may be going on and may enter the appropriate code by a trial and error process. Further, if an authorized call is received when the subscriber is away from the phone or otherwise unable to answer, there is no way to record the identity of the authorized caller so that the call may be returned. Finally, since the subscriber phone in the DeMeo system does not ring in response to unauthorized calls, the subscriber is unaware of such calls and is not provided with the option of answering them.

In the system disclosed in U.S. Pat. No. 4,266,098 (Novak), different codes are assigned to individual authorized callers, and the caller's name is displayed visually if his or her code is detected after reception of an incoming call. However, the subscriber's phone does not ring unless an authorized caller code is detected, thereby removing the subscriber's option of answering calls from unauthorized callers. Also, the subscriber must look at the visual display to determine the caller's identity and therefore must divert his or her attention from his or her present task. Further, in the Novak system, the code entry request is in the form of a recorded voice message which invites the caller to enter an authorization code. Unauthorized callers may, by trial and error, enter an authorized code and thereby gain unauthorized access to the subscriber.

Another telephone privacy system is disclosed in U.S. Pat. No. 4,074,078 (Jansen). That system has no means for distinguishing individual authorized callers from one another and does not produce a ringing in the subscriber's phone unless a correct authorization code is detected.

Other related types of privacy systems may be found in U.S. Pat. Nos. 4,369,339 (Castro et al), 3,787,626 (Subieta), 3,904,830 (Every et al), and 3,784,721 (Kilby). None of these prior art systems discriminates between authorized callers without requiring the subscriber to divert his or her attention; nor do the prior art systems perform a screening operation without making it evident to an unauthorized subscriber that such operation is being performed.

OBJECTS AND SUMMARY OF THE INVENTION

It is therefore an object of the present invention to provide a telephone privacy system which automatically informs the user when an incoming call is being processed as well as whether or not the caller is an authorized caller, and also identifies individual authorized callers, all without requiring the user to divert attention from tasks being performed.

It is another object of the present invention to provide audible indications in a telephone privacy system to distinguish authorized callers from unauthorized callers and to identify individual authorized callers. In addition, it is an object of the invention to provide a visual display which indicates the identity of authorized callers so that calls received when the user is unable to answer the phone may be returned at a later time.

A further object of the present invention is to provide a telephone privacy system which screens incoming calls without the knowledge of unauthorized callers, thereby precluding entry of authorization codes by unauthorized callers.

In accordance with the present invention, a telephone privacy system permits the first burst of ringing signal on a user's telephone line to activate the ringing circuit at the user's telephone to inform the user that a call is being received. The second ringing signal burst places the user's line off-hook but returns an audible signal to the caller in bursts which simulate the audible ringing signal normally returned to a calling party. The simulated audible ringing signal is an indication to authorized callers to enter their identification codes after the first simulated signal burst. Unauthorized callers, however, remain unaware that call screening is in process.

Authorized callers enter their identification codes by dialing in one or more numbers. In the disclosed preferred embodiment, this is done from a push-button phone using DTMF (Dual Tone Multi-Frequency) coding; however, it is within the scope of this invention to employ the same inventive concepts using rotary dial coding. The dialed numbers are received at the privacy system and are decoded into a binary address for a multiple tune generator. The tune generator provides a sequence of tones which depends on the address and which defines a melody assigned to a respective authorized caller, with one melody being assigned to unauthorized callers. The system user, therefore, is made aware that a call is being received by the single ring, is made aware of whether the caller is authorized or not by the audible melody, and is able to distinguish between authorized callers by that audible melody. The user can thus continue with his or her work or answer the phone without having to look at its display panel and without having the caller's voice distract him or her from that work. The decoded address is also used to activate a visual display at which indicator lamps are assigned to each authorized caller. If the user ignores a particular call, or if the user is not near the phone when an authorized call is received, the visual display informs the user as to the identity of authorized callers from whom calls have been received.

BRIEF DESCRIPTION OF THE DRAWINGS

These and other objects, features and many of the advantages of the present invention will be better understood from reading the following detailed description considered in connection with the accompanying drawings wherein like parts in each of the several figures are identified by the same reference numerals and wherein.

DESCRIPTION OF THE PREFERRED EMBODIMENTS

Figure 1A:
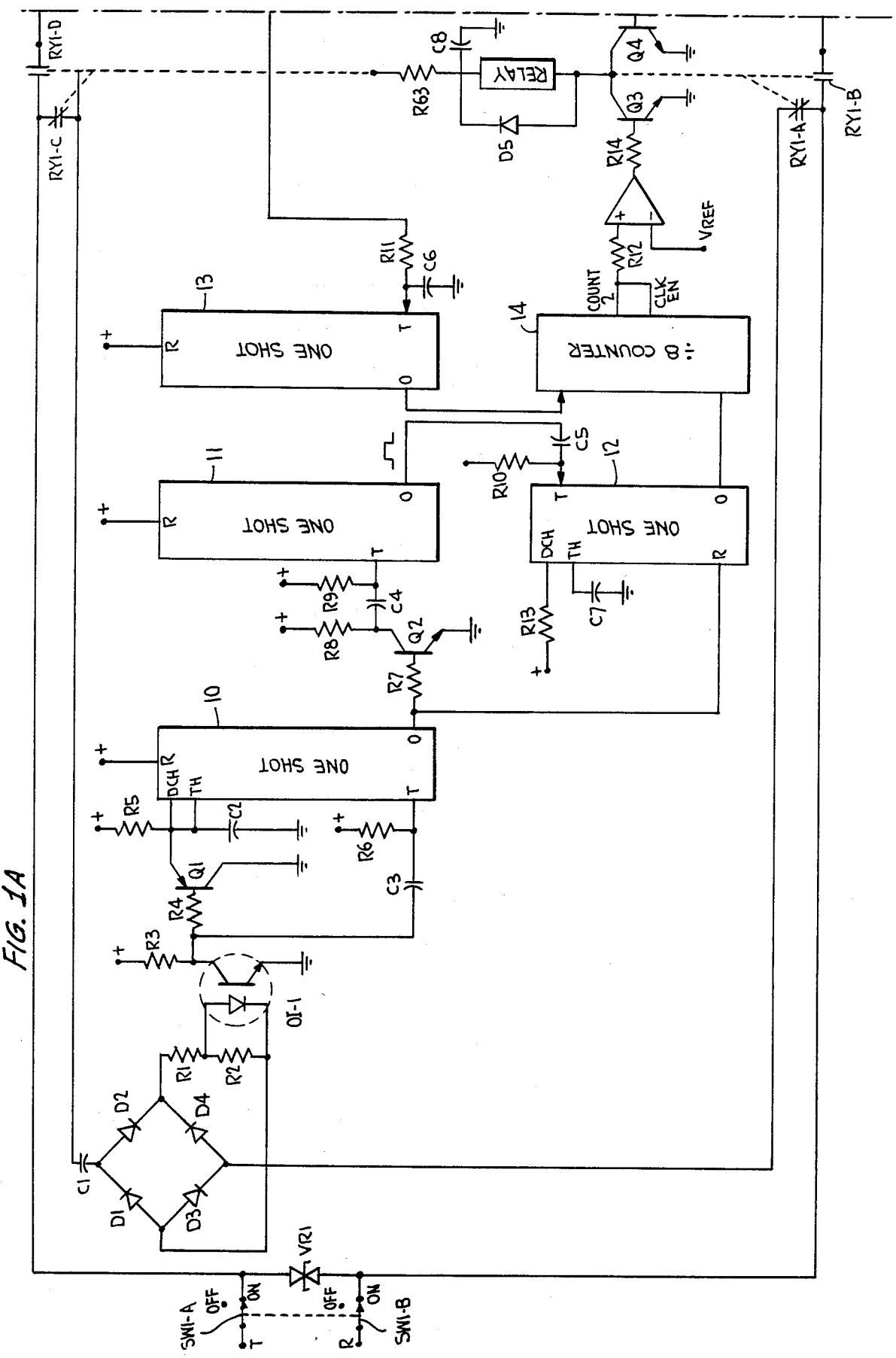
FIGS. 1A, 1B, 1C and 1D constitute an electrical schematic diagram of a preferred embodiment of the present invention when these figures are placed together in the manner illustrated in FIG. 2.

Referring to the accompanying drawings, a call detecting portion of the disclosed preferred embodiment is illustrated in FIG. 1A to which specific reference is now made. The privacy system of the invention is connected across the tip T and ring R terminals of the telephone line of the subscriber or user. The privacy system is selectively actuated by means of sections SW1-A and SW1-B of a two-pole, double-throw switch, which sections are connected to the T and R terminals, respectively. The ganged switch sections SW1-A and SW1-B actuate the privacy system when in their ON positions, in their OFF positions the privacy system is disconnected from the telephone line. A voltage regulator diode VR1 is connected between the ON contacts of the two switch sections to eliminate overvoltage conditions in the subsequent circuitry.

The switched T line voltage is applied through normally-closed contacts RY1-C of relay RY1 and capacitor C1 to one side of a full wave rectifier diode bridge which includes diodes D1, D2, D3 and D4. The switched R line is connected through normally-closed relay contacts RY1-A to the opposite side of the bridge. In particular, the switched T voltage is applied to the bridge at the junction between the cathode of diode D1 and the anode of diode D2; the switched R voltage is applied at the junction between the cathode of diode D3 and the anode of diode D4. The output voltage from the bridge is taken across the junction of the cathodes of diodes D2 and D4 and the junction of the anodes of diodes D1 and D3. This voltage is applied across series-connected resistors R1 and R2.

An opto-isolator OI-1 has its LED (Light Emitting Diode) connected across resistor R2, the emitter of its phototransistor connected to circuit ground, and the collector of its phototransistor coupled to a positive supply voltage (nominally 15 volts) through a resistor R3. The collector of the phototransistor is also coupled to the base of a PNP transistor Q1 through resistor R4, and to the trigger input terminal of a re-triggerable one-shot multivibrator 10 through capacitor C3. The emitter of transistor Q1 is connected to the discharge and threshold terminals of one-shot multivibrator 10 which, by way of example, may be an LM555 timer or one-half of an LM556 dual timer such as is sold by the National Semiconductor Corporation. A capacitor C2 is connected between ground and the emitter of transistor Q1 which has its collector grounded. The trigger terminal of one-shot multivibrator 10 is resistively coupled to the positive supply voltage through resistor R6; the reset terminal of one-shot multivibrator 10 is directly coupled to the positive voltage supply.

The output signal from one-shot multivibrator 10 is coupled to the reset terminal of a one-shot multivibrator 12 and to the base of NPN transistor Q2 through a resistor R7. Transistor Q2 has its emitter grounded and its collector coupled to the trigger terminal of a further one-shot multivibrator 11 through capacitor C4. Opposite sides of capacitor C4 are resistively coupled to the positive supply voltage via respective resistors R8 and R9. One-shot multivibrator 11 has its output signal coupled through capacitors C5 to the trigger terminal of one-shot multivibrator 12, which terminal is also resistively coupled to the positive supply voltage through resistor R10. The discharge and threshold terminals of one-shot multivibrator 12 are connected to the junction between resistor R13 and capacitor C7 which are connected in series between the positive supply voltage and ground. One-shot multivibrators 11 and 12 may be the same general type as one-shot multivibrator 10.

The output signal from one-shot multivibrator 12 is applied to the clock input terminal of a binary counter 14 which, by way of example, may be a model CD4022 divide-by-eight counter sold by National Semiconductor Corporation. The reset input terminal of counter 14 is connected to the output terminal of a further one-shot multivibrator 13 which may be of the same type as one-shot multivibrator 10. The reset terminals of both one-shot multivibrators 11 and 13 are connected directly to the positive supply voltage. One-shot multivibrator 13 receives its trigger signal from the collector of the phototransistor which is part of an opto-isolator OI-2 described below in relation to FIG. 1C. This signal is received through series resistor R11 and across capacitor C6 which is coupled to ground.

The decoded output signal present at a count of two at counter 14 is fed to the clock enable terminal of that counter and through resistor R12 to the non-inverting input terminal of an operational amplifier 15. The inverting input terminal of amplifier 15 is connected to a pre-selected reference voltage. An NPN transistor Q3 has its base driven by the output signal from amplifier 15 via resistor R14, and has its emitter grounded. The collector of transistor Q3 is connected to one side of the energizing coil of relay RY1, the other side of which is coupled to the positive supply voltage through a resistor R14. A diode D5 is connected in parallel with relay RY1 with its cathode connected to the junction between the energizing coil and resistor R4. Capacitor C8 is connected between that same junction and ground. A further NPN transistor has its collector-emitter circuit connected in parallel with the collector-emitter circuit of transistor Q3. The base of transistor Q4 is driven by operational amplifier 16 described below in relation to FIG. 1C.

Also illustrated in FIG. 1A are normally open contacts RY1-B and RY1-D of relay RY1. These contacts, when closed, connect the switched R and T signals, respectively, to the call processing and coded identification circuitry in FIG. 1C.

Figure 1B:
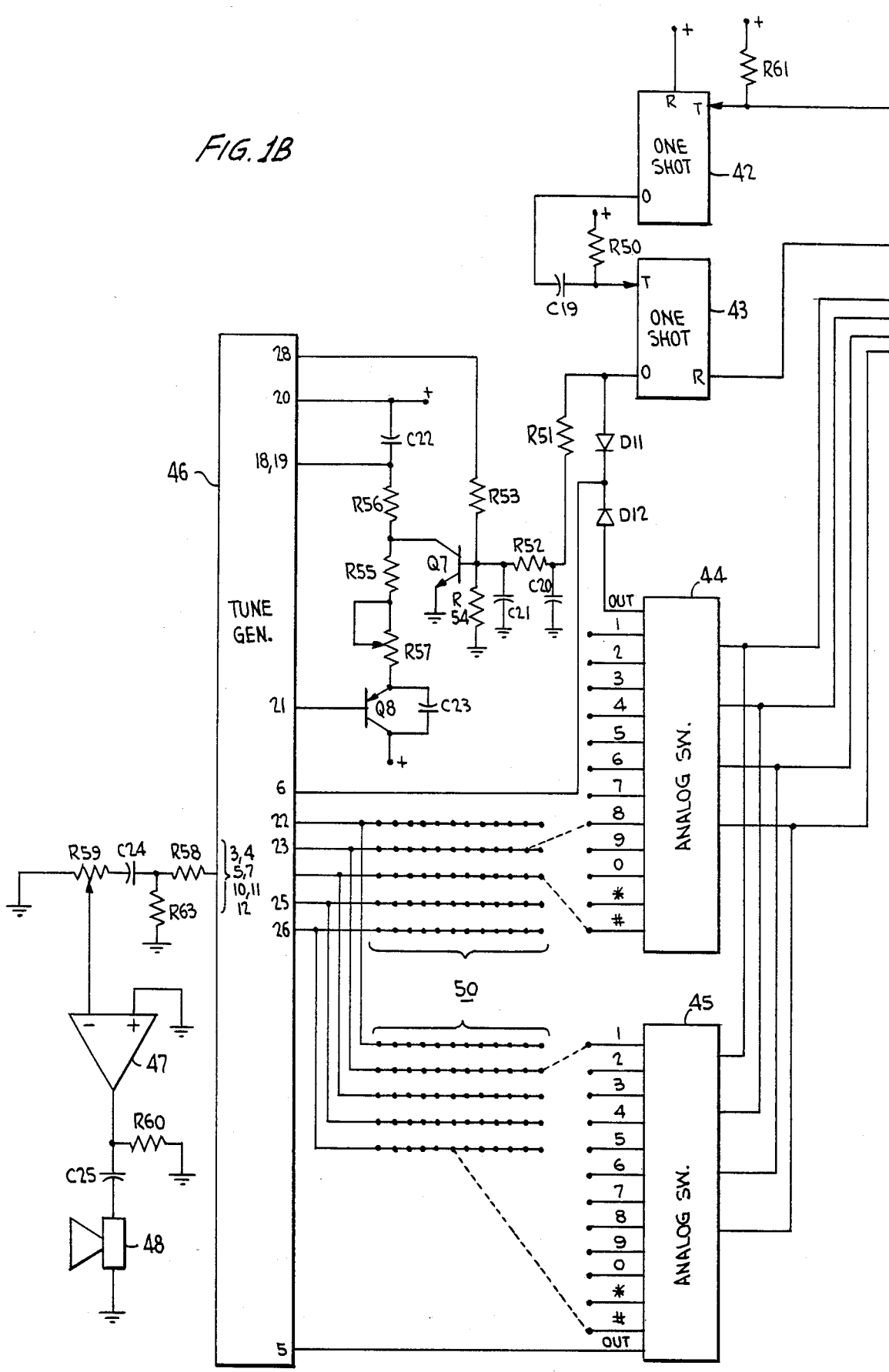
Figure 1C:
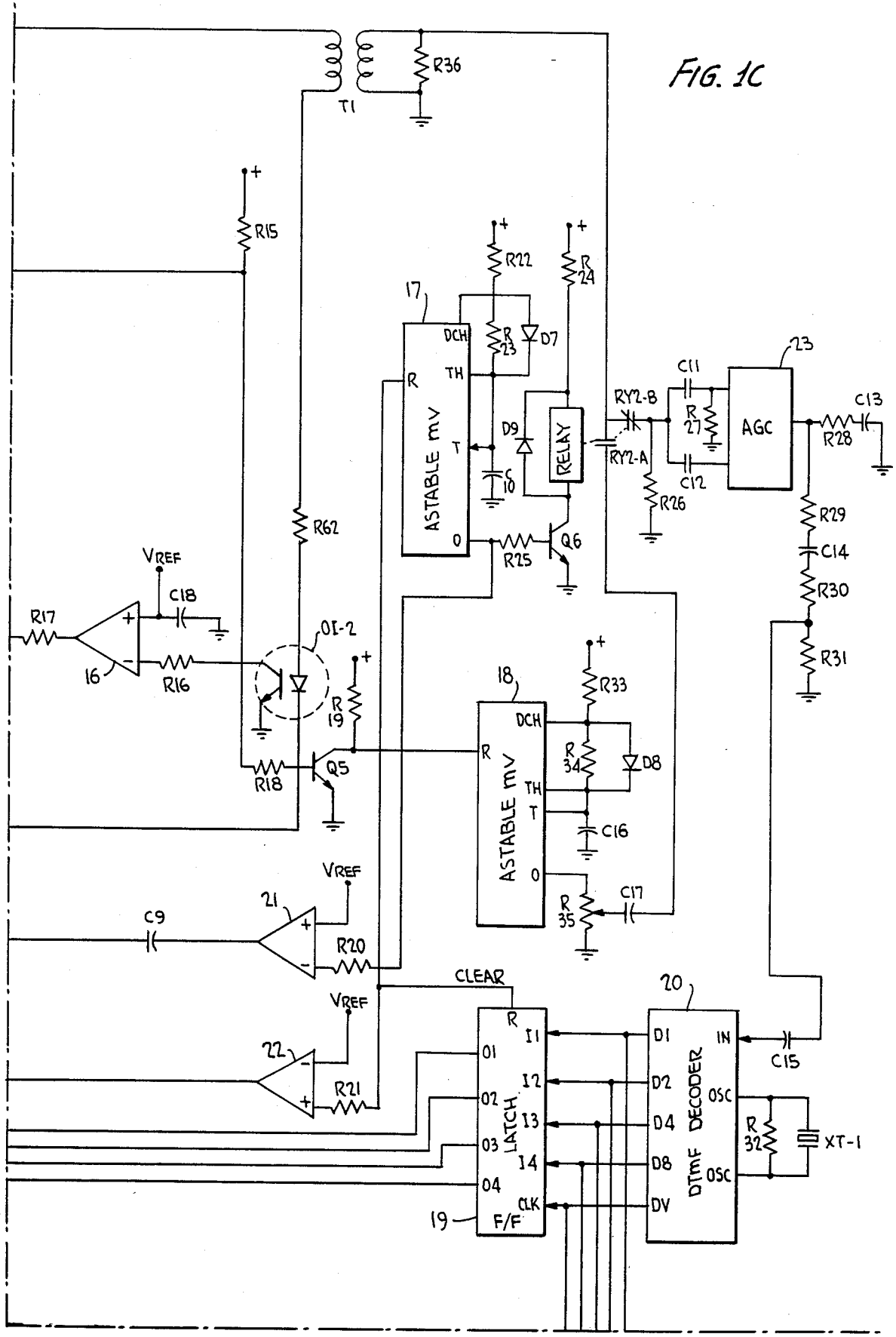

Referring to FIG. 1C in greater detail, the primary winding of a transformer T1 has one side connected to receive the switched T signal to a normally open relay contact RY1-D. The other side of this winding is connected in series with resistor R62, zener diode D6, the LED of opto-isolator OI-2 and normally-open contact RY1-B. The collector of the phototransistor of this opto-isolator is connected to: the trigger terminal of one-shot multivibrator 13 via resistor R11 (FIG. 1A); the positive supply voltage via resistor R15; the inverting input terminal of operational amplifier 16 via resistor R16; and the base of NPN transistor Q5 via resistor R18. The emitter of the phototransistor is grounded, as is the emitter of transistor Q5. The non-inverting input terminal of operational amplifier 16 is connected to a reference voltage and to one side of a capacitor C18, the other side of which is connected to ground. Operational amplifier 16 provides its output signal to resistor R17 to the base of transistor Q4 (FIG. 1A).

The collector of transistor Q5 is biased by the positive supply voltage via resistor R19 and is connected to the non-inverting input terminal of operational amplifier 22 via resistor R21, and to the reset terminals of astable multivibrator 17, astable multivibrator 18 and latch 19. Astable multivibrators 17 and 18 may each be timer circuits of the same type as one-shot multivibrator 10, but configured to operate in an astable mode. When the reset terminal of these circuits is at low binary level, the circuit is disabled; when the reset terminal level is high, the circuit provides an alternating output signal. A series circuit comprising resistors R22 and R23 and capacitor C10 is connected between the positive supply voltage and ground. The discharge terminal of the astable multivibrator 17 is connected to the junction between resistors R22 and R23; the threshold terminal of astable multivibrator 17 is connected to the junction between resistor R23 and capacitor C10. A diode D7 is connected between the discharge and threshold terminals from anode to cathode, respectively. The trigger terminal of astable multivibrator 17 is connected to the threshold terminal. Another series circuit includes resistors R33 and R34 and capacitor C16 connected between the positive supply voltage and ground. The discharge terminal of astable multivibrator 18 is connected to the junction between resistors R33 and R34; its threshold terminal is connected to the junction between resistor R34 and capacitor C16; and a diode is connected between the discharge and threshold terminals from anode to cathode, respectively. The trigger terminal of astable multivibrator 18 is connected to the junction between resistor R34 and capacitor C16.

The alternating output signal from astable multivibrator 17 is connected to a resistor R25 to the base of NPN transistor Q6, and through resistor R20 to the inverting input terminal of operational amplifier 21. Transistor Q6 has its emitter grounded and its collector connected to one side of the energizing coil of a relay RY2. The other side of relay coil RY2 is coupled through resistor R24 to the positive supply voltage. A diode D9 is connected across relay coil RY2 with its anode connected to the collector of transistor Q2.

The alternating output signal from astable multivibrator 18 is connected across adjustable resistor R35 to ground. The wiper arm of the adjustable resistor is coupled through capacitor C17 and the normally-open contacts RY2-A of relay RY2 to one side of the secondary winding of transformer T2. The other side of the secondary winding is grounded, and a resistor R36 is connected directly across this winding.

The secondary winding of transformer T1 is also coupled through normally-closed relay contacts RY2-B to one side of each of capacitors C11 and C12, the other sides of which are connected to respective input terminals of an AGC circuit 23. The other side of capacitor C11 is also returned to ground through resistor R27. AGC circuit 23 may, by way of example, by a Signetics Model 571. Its output signal is connected across a first series circuit including resistor R28 and capacitor C13, and a second series circuit including resistor R29, capacitor C14 and resistors R30 and R31. Both series circuits are returned to ground. The junction between resistors R30 and R31 is connected to the input terminal of a DTMF (Dual Tone Multi-Frequency) decoder 20 through capacitor C15. DTMF decoder 20 has four hexidecimal output signals D1, D2, D4 and D8, representing code tone pairs received at the decoder input terminal. Each code tone pair corresponds to a digit in accordance with the telephone system coding scheme. A digit valid terminal DV provides a high level output signal when a DTMF coded digit has been decoded and appears at D1, D2, D4 and D8. The DTMF decoder may, for example, be an SSI Model 201. The parallel combination of a crystal XT-1 and resistor R32 is connected across the oscillator connection terminals of the DTMF decoder. Crystal XT-1 may, for example, be tuned to 3.574545 MHz.

The hexidecimal output bits D1, D2, D4 and D8 from DTMF decoder 20 are applied to respective input sections I1, I2, I3 and I4 of latch 19 which, for example, may be a 74C175 quad "D" flip flop. The latch clock terminal receives the DV signal from DTMF decoder 20. These decoder output signals are also applied to the visual display control logic described below in relation to FIG. 1D. The output signals O1, O2, O3 and O4 from latch 19 are applied to the audible indicator circuitry described below with reference to FIG. 1B.

Operational amplifiers 21 and 22 operate as comparators having reference voltages applied to their non-inverting and inverting input terminals, respectively. The output signals from these operational amplifiers are applied to the audible indicator circuitry illustrated in FIG. 1B.

Referring to FIG. 1B in greater detail, the audible indicator portion of the circuit includes one-shot multivibrators 42 and 43, which may be of the same general type as one-shot multivibrator 10. The trigger input terminal at one-shot multivibrator 42 is biased by the positive supply voltage through resistor R61 and receives the output signal from operational amplifier comparator 21 through capacitor C9 (FIG. 1C). The reset terminal of one-shot multivibrator 42 is positively biased by the positive supply voltage, and the output signal is applied through capacitor C19 to the trigger input terminal of one-shot multivibrator 43, which is biased at the positive supply voltage through resistor R50. The reset terminal of one-shot multivibrator 43 receives the output signal from comparator operational amplifier 22 (FIG. 1C). The output terminal of one-shot multivibrator 43 is connected through diode D11 to pin 6 of a tune generator 46, which may be Model MP1173A-N1, which is a thirty tune microprocessor. This unit operates by providing a melody at its output pins 3, 4, 5, 7, 10, 11, 12, which melody is selected in accordance with which of the address pins 22-26 is connected to pins 5 and 6 via analog switches 44 and 45. The output terminal of one-shot multivibrator 43 is also connected to the bias and control circuitry for tune generator 46, which circuitry includes transistors Q7 and Q8, resistors R52-R57, and capacitors C20-C23.

Analog switches 44 and 45 may be Model CD4067B analog switches which, depending upon the states of its four input address bits, internally connects its output terminal (OUT) to a selected switched terminal 1-9, *or#. The output signal from analog switch 44 is connected through diode D12 to pin 6 of tune generator 46. The output terminal of analog switch 45 is connected directly to pin 5 of tune generator 46. Diodes D11 and D12 prevent mutual interaction between the output signals of one-shot multivibrator 43 and analog switch 44, both of which outputs are connected via respective diodes to the pin 6 at tune generator 46. The switched terminals of the analog switches 44 and 45 are connected to respective strapping points of tune generator 46, the strapping points being connected to the address pins 22–26 of the tune generator. Thus, depending upon the strapping connections between strapping points 50 and the analog switches, the four-bit input signal to the analog switches determines the melody selected at the tune generator. This four-bit input signal for the analog switches 44 and 45 is the four-bit decoded caller identification code number stored at latch 19 of FIG. 1C.

The output terminals 3, 4, 5, 7, 10, 11 and 12 of tune generator 46 are connected to one another and applied across resistors R58 and R61 which are connected in series and returned to ground. The junction between these resistors is connected to one end of capacitor C24, the other end of which is connected to one end of potentiometer R59. The other end of the potentiometer is connected to ground, and its wiper arm is connected to the inverting input terminal of operational amplifier 47. The non-inverting input terminal of operational amplifier 47 is grounded. The output of this operational amplifier is applied across resistor R60, which is returned to ground, and through capacitor C25 to the loud speaker 48 which audibly reproduces the melody selected at tune generator 46 at a volume determined by the setting at potentiometer R59.

Figure 1D:
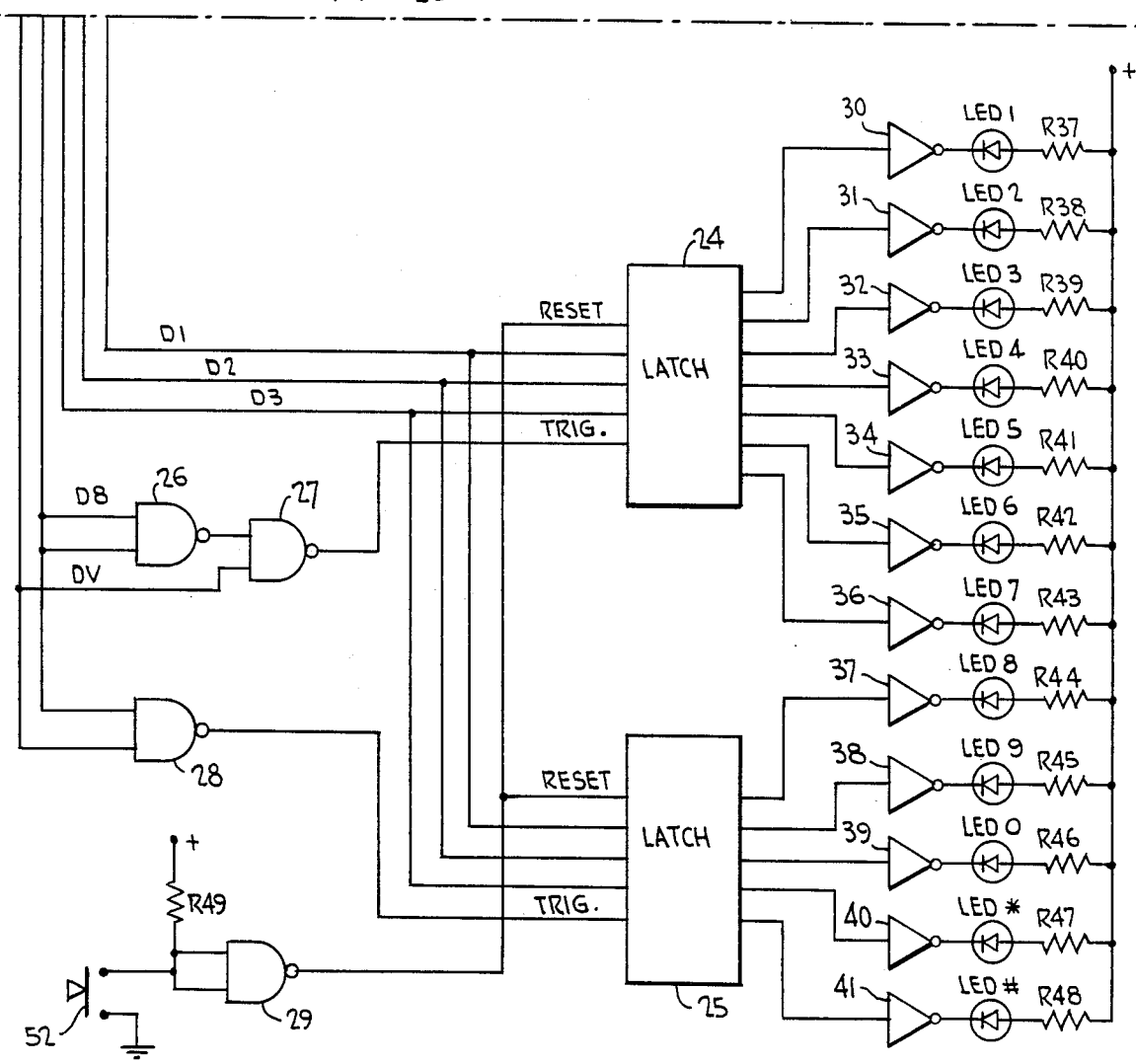
Figure 2:
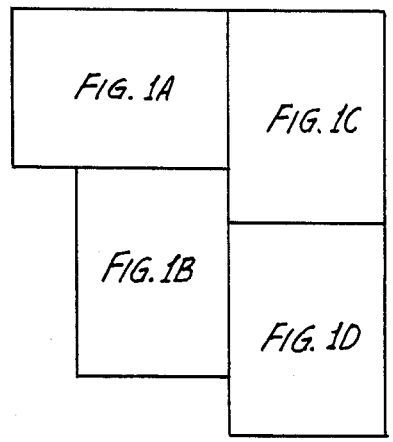

Referring to the visual indicator circuitry in FIG. 1D, the five output signals D1, D2, D4, D8 and DV from the DTMF decoder 20 are utilized to control this circuitry. The D1, D2 and D4 signals are employed as address signals for each of the addressable latches 24 and 25 which are eight-bit addressable latches such as Model CD4099B manufactured by National Semiconductor Corporation. The D8 signal is applied to both inputs of a NAND gate 26, operating as an inverter, and to one input of NAND gate 28. The other input of NAND gate 28 receives the DV signal which is also connected to an input of NAND gate 27. The other input of NAND gate 27 is received from the output of NAND gate 26. The output signals from NAND gates 27 and 28 serve as trigger signals for latches 24 and 25, respectively. A reset circuit for latches 24 and 25 includes a NAND gate 29, operating as an inverter, which has both inputs connected to one side of a switch S2 and one side of a resistor R49. The other side of the switch is grounded while the other side of resistor R49 is connected to the positive supply voltage. The output signal from NAND gate 29 provides the reset signal for latches 24 and 25 in response to closure of switch S2.

The output signals from latches 24 and 25 are connected to respective inverters 30–41 which selectively provide return paths to ground for respective light emitting diodes LED1–LED9, LED0, LED* and LED#. These LED's are powered by the positive supply voltage through respective resistors R37–R48.

In operation, the system assumes a standby mode when switch SW1-A and SW1-B is in the ON position and no call is being processed. In the standby mode, the full wave rectifier bridge D1, D2, D3 and D4 is connected to the telephone line through the normally-closed relay contacts RY1-A and RY1-C and through capacitor C1. No current flows through the line in this mode, so that no current flows through the LED of opto-isolator OI-1. The phototransistor of this opto-isolator is therefore cut off, as is transistor Q1. The output signal from one-shot multivibrator is low (i.e., binary zero) and is applied to the reset terminal of one-shot multivibrator 12 to thereby disable that one-shot multivibrator. In addition, transistor Q2 is cut off so that the output signal from one-shot multivibrator 11 is low. The output signal of one-shot multivibrator 12 is also low at this time. Capacitor C6, connected to the trigger input terminal of one-shot multivibrator 13 is charged to the positive supply voltage so that the output signal from this multivibrator is also low. Counter 14 is therefore reset so that its "COUNT 2" output signal is low at the non-inverting input terminal of operational amplifier 15. This maintains the output signal of operational amplifier 15 low so that transistor Q3 is cut off and relay RY1 is de-energized.

The normally-open relay contacts RY1-B and RY1-D prevents current flow through the series circuit including the primary winding of transformer T1, resistor R62, zener diode D6 and the LED of opto-isolator OI2. With no current passing through this LED, the phototransistor of opto-isolator OI2 is cut off so that the inverting input terminal of operational amplifier 16 is high. This high level exceeds the reference voltage applied to the non-inverting input terminal of operational amplifier 16 so that the output signal from that operational amplifier is low and maintains transistor Q4 in a cut off state.

The high output signal level from the phototransistor in opto-isolator OI2 drives transistor Q5 into saturation, thereby applying a low level signal to the reset terminals of astable multivibrator 17, astable multivibrator 18 and latch 19. The astable multivibrators are disabled thereby while latch 19 is cleared to provide all zeros at its output terminals. The low caused by saturation of transistor Q5 is also applied to operational amplifier 22 to disable one-shot multivibrator 43.

With astable multivibrator 17 disabled, its output signal is low and transistor Q6 is cut off. Relay RY2 is therefore de-energized, maintaining relay contacts RY1-A and RY1-C closed while contact RY1-B and RY1-D are open. The low output signal from astable multivibrator 17 is also applied to the inverting input terminal of comparator operational amplifier 21 causing the output signal from that amplifier to be high.

All of the output signals from the DTMF decoder 20 are low at this time since there is no coded signal being received. In addition, if the latches 24 and 25 have been reset by switch S2 since the last incoming call, none of the LED's in FIG. 1D is illuminated.

When an incoming call is received, the telephone company applies a ringing signal across the T and R lines. This signal is approximately 105 volts at 20 Hz, and is on for approximately two seconds and off for approximately four seconds on a cycling basis. This ringing cycle repeats until the telephone is placed in the off-hook state. This 20 Hz ringing signal is fed through the normally-closed contacts RY1-C and capacitor C1 to the full wave bridge rectifier. The output of the full wave bridge rectifier is a series of pulses of approximately 25 millisecond positive pulses which are present for approximately two seconds out of every six. These pulses cause current to flow through the LED of opto-isolator OI-1 which is illuminated thereby and turns on the associated phototransistor. The output of the phototransistor is therefore a series of negative-going pulses of approximately 25 milliseconds duration. The first negative pulse triggers one-shot multivibrator 10 so that its output signal goes high to enable one-shot multivibrator 12 and to trigger one-shot multivibrator 11 by rendering transistor Q2 conductive. The output signal from one-shot multivibrator 10 remains high as long as the ringing voltage is present. This is due to the fact that transistor Q1 is rendered conductive with each negative pulse and, when conductive, discharges capacitor C2 through its emitter-collector circuit. Since the time interval between the negative pulses is shorter than the discharge time constant established by capacitor C2 and resistor R5, the capacitor is prevented from charging to the level required to turn off the one-shot multivibrator 10.

The output signal from one-shot multivibrator 11 is a one second pulse. When this pulse terminates, the output signal from one-shot multivibrator 11 goes low, thereby triggering one-shot multivibrator 12 if the reset terminal of one-shot multivibrator 12 is still held high by the output signal from one-shot multivibrator 10. Since the ringing signal is present for two seconds for each ring, the one second delay occasioned by one-shot multivibrator 11 is well within the duration of the high output signal provided by one-shot multivibrator 10. When one-shot multivibrator 12 is triggered, its output signal goes high for approximately two milliseconds and thereby increments counter 14 to a count of one.

At the end of the two-second initial ring period, the ringing signal stops and the phototransistor collector at optoisolator OI-1 goes high. Approximately fifty milliseconds later, capacitor C2 discharges sufficiently to cause the output signal from one-shot multivibrator 10 to go low, thereby disabling one-shot multivibrator 12 and preventing that one-shot multivibrator from being triggered.

Approximately four seconds later, the ringing signal resumes for the second ring, whereupon the procedure described above repeats. This time, however, counter 14 is incremented to a count of two so that its "COUNT 2" output signal goes high. This disables the counter through the CLK EN terminal to prevent further incrementing of the counter. In addition, the output signal from operational amplifier 15 is caused to go high since the non-inverting input voltage exceeds the reference voltage at the inverting input terminal. Transistor Q3 is then driven into conduction so that relay RY1 is energized. Upon energization of relay RY1, the normally-closed contacts RY1-A and RY1-C are opened, and the normally-open contacts RY1-B and RY1-D are closed. This has the effect of placing across the telephone lines the series circuit which includes the primary winding of transistor T1, resistor R62, zener diode D6 and the LED in opto-isolator OI-2. Current from the ringing signal flows through this series circuit and trips a relay at the telephone central office which stops the ringing signal. The LED in opto-isolator OI-2 is illuminated, turning on the associated phototransistor to render its collector voltage low. This low voltage is reflected at the inverting input terminal of operational amplifier 16 and is lower than the reference voltage applied to the non-inverting input terminal of that amplifier. The output signal from operational amplifier 16 is therefore driven high to render transistor Q4 conductive. In addition, the low voltage at the collector of the phototransistor of opto-isolator OI-2 permits capacitor C6 at the trigger terminal of one-shot multivibrator 13 to discharge through resistor R11. When the charge on capacitor C6 drops sufficiently, one-shot multivibrator 13 is triggered on and its output signal goes high for approximately one millisecond. This resets counter 14 to a zero count. The COUNT 2 signal from counter 14 goes low and forces the output signal from operational amplifier 15 low. Operational amplifier Q3 is thereby cut off; however, since transistor Q4 has been turned on, relay RY1 remains energized.

The low voltage at the collector of the phototransistor in opto-isolator OI-2 is applied to the base of transistor Q5 which is rendered non-conductive thereby. The collector voltage of transistor Q5 is therefore driven high to enable astable multivibrators 17 and 18 and latch 19 at their respective reset terminals. In addition, the one-shot multivibrator 43 is enabled via operational amplifier 22.

When astable multivibrator 17 is enabled, its output terminal provides a repetative signal which is high for approximately one second and low for approximately three seconds. When the output signal is high, it renders transistor Q6 conductive to energize relay RY2. Energization of relay RY2 causes its normally-open contacts RY2-A to close and thereby connect the output signal from astable multivibrator 18 to the telephone line through transformer T1.

When astable multivibrator 18 is enabled, its output signal is a square wave of approximately 500 Hz. This signal, when fed to the telephone line through contacts RY2-A and transformer T1, is interrupted periodically by the output signal from astable multivibrator 17 operating on transistor Q6 to repetatively energize and de-energize relay RY2. To simulate the audible ringing circuit heard by the caller when the called party's telephone is ringing. In addition, this simulated audible ringing signal alerts an authorized calling party to enter the coded digit representing his or her identity. This digit is entered upon cessation of the first burst of simulated audible ringing signal. Unauthorized callers are not aware of the necessity to enter a code at this time and are left to believe that the called party's telephone is still ringing.

When the output signal from astable multivibrator 17 is high, it drives the output signal of operational amplifier 21 low and thereby triggers one-shot multivibrator 42. The resulting output signal from one-shot multivibrator 42 goes high for approximately four seconds and then returns to its low state. The return to the low state triggers one-shot multivibrator 43 whose output signal then goes high for approximately two milliseconds to turn on the tune generator 46. The four second delay caused at the output terminal of one-shot multivibrator 42 prior to the triggering of one-shot multivibrator 43 provides sufficient time for an authorized calling party to enter an identification digit by pressing the appropriate telephone push button (or, for other embodiments, by dialing the appropriate number on a rotary dial). This, of course, presupposes that all authorized calling codes include only one digit. If two or more digits are employed, the delay occasioned by one-shot multivibrator 42 can be increased.

If the calling party enters a digit, the AGC circuit 23 receives the dual tone multifrequency coded signal via relay contact RY2-B during the interval when relay RY2 is de-energized. The AGC circuit 23 amplifies the two code tones which are decoded by the DTMF decoder 20. The decoded signal, in the forms of bits D1, D2, D4 and D8, is stored in the latch circuit 19. For example, if the calling party had entered the digit five, the O1 and O3 output signals from latch 19 become high while the O2 and O4 signals become low. This is effected by the DV signal provided by the DTMF decoder 20 to the clock input terminal of latch 19 if a valid digit has been detected by decoder 20. In other words, the DV signal clocks the states of the D1, D2, D4 and D8 signals into the latch 19. Assuming that the digit five is represented at the output of latch 19, analog switches 44 and 45 respond by connecting their pins 1 to the pins 4 internally to correspond to the selection of the digit five. More particularly, switches 44 and 45 are the equivalent of individual sixteen-position rotary switches with the OUT terminal corresponding to the common or rotary connection. The OUT terminal is connected to one of the other terminals, internally of the switch, in accordance with the code applied to the input address terminals. Assuming, as noted above, that the entered digit corresponds to digit five, the tune selected at the tune generator 46 depends upon the strapping connections made between the switches 44, 45 and the strapping terminals 50 of the tune generator. The selected tune is amplified by amplifier 47 and rendered audible by loudspeaker 48.

The characteristics of tune generator 46 are such that the tune is repeated every four seconds until the called party picks up the telephone or the calling party hangs up. If the calling party does not enter a code digit, a "no code" tune is rendered auibible; however, if desired, a particular tune may be utilized to indicate the no code entry condition.

When the called party picks up the telephone, the d.c. voltage on the telephone line drops to a low value due to the shunting effect of the telephone instrument. This voltage is below the avalanche voltage of zener diode D6 so that this diode is rendered non-conductive and no current flows through the LED of opto-isolator OI-2. The phototransistor of that opto-isolator is rendered non-conductive so that a high voltage appears at its collector. This voltage is greater than the reference voltage applied to the non-inverting input terminal of operational amplifier 16 so that the output of that operational amplifier drops to a low level. Transistor Q4 is thereby cut off and relay RY2 is de-energized. Transformer T1 and its associated circuitry is thus removed from the telephone line. In addition, transistor Q5 is rendered conductive and the resulting low level at its collector disables astable multivibrator 17, astable multivibrator 18, latch 19 and one-shot multivibrator 43 (via operational amplifier 22). The system is then placed in condition to receive another call.

The visual indicator circuitry in FIG. 1D can be considered to operate as an additional indicator to the audible indication provided by the tune generator 46. Specifically, if an authorized caller has entered his or her digit code, the output signals from the DTMF decoder 20 in FIG. 1C are applied to the circuit in FIG. 1D. Assuming that a digit five code has been entered, the D1 and D4 lines are high while the D2 line is low. The output signal from NAND gate 26 is thereby rendered high. The DV signal is also high, indicating that a valid digit has been identified by the decoder 20. This high level signal combines with the high level output signal from NAND gate 26 to drive the output of NAND gate 27 low, thereby latching the data into latch 24. A single output line from latch 24 is driven high and applied to inverter 34 so that the output of that inverter is driven low. The LED five is thereby illuminated. That LED remains illuminated until such time as switch S2 is depressed to reset the latches 24 and 25. Latch 25 is not part of the illumination of LED five since data bit D8 remains low for entry of code digit five. If the entered code digit had been between eight and twelve, the D8 bit would have been high causing the output signal of NAND gate 26 to remain low while the output signal of NAND gate 27 would be driven high. Latch 24, under such circumstances would not be part of the visual indicator process. Rather, the output signal from NAND gate 28 would be driven low when the DV signal went high. This latches the data applied to the data input pins of latch 25 and causes the coded selected output to energize the appropriate LED.

Data latched into latch 24 or 25 remains undisturbed until the reset button S2 is depressed. Thus, the energized LED's retain a history of calls received until the reset switch is depressed. It should be noted, however, that incoming calls not accompanined by an entered code digit do not result in energization of an LED.

From the foregoing description it will be appreciated that the invention makes available a novel system for providing different audible signals representing respective authorized callers who are attempting to reach a called party. The audible signals permit the called party to continue working and not look at a visual indicator in order to determine the identity of the calling party. By returning simulated audible ringing signal to the calling party, unauthorized calling parties are not made aware that a caller screening process is taking place. A simulated audible ringing signal also serves to indicate to authorized calling parties that the identification code should be entered. The system permits at least one ring to notify the called party that a received call is being processed, thereby permitting the called party to answer the phone irrespective of the identity of the calling party. A visual indicator is provided to identify calling parties on a display which remains energized, until manually reset, to provide a record of authorized calling parties.

Having described several embodiments of a new and improved call screening system constructed in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

APPENDIX

The following is a list of components and their values which may be employed in the preferred embodiment of the present invention as described herein:

| COMPONENT LIST | |
|---|---|
| COMPONENT | VALUE |
| Resistors | (ohms) |
| R1, R7, R12, R16, R18, R20, R21, R50, R52, R61 | 15K |
| R2 | 470 |
| R3, R19, R55 | 4.7K |
| R4, R5, R13, R26, R57 | 100K |
| R6, R9, R10 | 20K |
| R8 | 5.1K |
| R11, R27, R32 | 1 M |
| R14, R17 | 6.8K |
| R15 | 1K |
| R22 | 120K |
| R23 | 300K |
| R24, R62 | 180 |
| R25 | 2.2K |

-continued

COMPONENT LIST

| COMPONENT | VALUE |
|---|---|
| R28 | 33K |
| R29 | 100 |
| R30, R31 | 47K |
| R33, R34 | 13K |
| R35 | 5K |
| R37-R48 | 1200 |
| R49, R59 | 10K |
| R51 | 39 |
| R53 | 5.6K |
| R54 | 3K |
| R56 | 75K |
| R60 | 2.7 |
| Capacitors | (microfarads) |
| C1, C2, C7 | 0.47 |
| C3-C5, C9, C15, C19, C21 | 0.01 |
| C6, C11, C12, C14, C20 | 1.0 |
| C8, C10, C13, C17, C18 | 10 |
| C16 | 0.1 |
| C22 | 27 pico |
| C23 | 47 |
| C24 | 0.047 |
| C25 | 300 |
| Transistors | |
| Q1, Q8 | 2N 3706 |
| Q2-Q7 | 2N 2222 A |

What we claim is:

1. A telephone privacy system for use in conjunction with a user's telephone line and receiver/transmitter unit for permitting the user to screen incoming calls, without answering the calls, on the basis of a coded identification signal transmitted by a calling party on the telephone line, said system comprising:
   first means responsive to said coded identification signal received on the user's telephone line for automatically providing a plurality of audio tones in a sequence which is determined by the receive coded identification signal; and
   second means for rendering said plurality of audio tones audible externally of said system;
   wherein plural different coded identification signals can be employed in said system to uniquely identify respective authorized callers, and wherein said first means comprises:
   decoder means responsive to received coded identification signals for providing respective decoded address signals representing the coded identification in the received signal; and
   tune generator means for providing said plurality of tones as a recognizable tune determined by the decoded address signal.

2. The system according to claim 1 further comprising visual display means responsive to said decoded address signals for visually displaying an indication of the identify of the caller represented by the received coded identification signals.

3. The system according to claim 1 further comprising:
   ringing signal detection means responsive to sequential bursts of ringing signal appearing on the user's telephone line for permitting actuation of a ringing circuit in the user's unit in response to at least one of said bursts, and for placing the user's line in an off-hook state in response to a subsequent burst.

4. The system according to claim 3 further comprising means responsive to said off-hook state for transmitting simulated audible ringing signal on said user's line to the calling party.

5. The system according to claim 3 further comprising means responsive to said off-hook state for transmitting an entry request signal on the user's line to indicate to the calling party that a coded identification signal can be received and processed by said system.

6. The system according to claim 5 wherein said entry request signal is a simulated audible ringing signal.

7. The system according to claim 6 wherein said entry request signal is a sequence of bursts of an audible signal.

8. The system according to claim 1 further comprising switch means for selectively disconnecting said system from the user's telephone line.

9. A telephone privacy system for use with a user's telephone set connected to the user's telephone line, said system comprising:
   ringing signal detection means responsive to plural sequential bursts of ringing signal appearing on the user's line for permitting actuation of a ringing circuit in the user's telephone set in response to at least one of said bursts and for placing the user's line in an off-hook status in response to a subsequent burst;
   means responsive to said off-hook state for transmitting a simulated audible ringing signal on the user's line; and
   means operative in the off-hook state for decoding caller-identifying coded signals appearing on the user's line.

10. The system according to claim 9 wherein said means for transmitting transmits said simulated audible ringing signal as a sequence of bursts of an audible signal.

11. The system according to claim 9 wherein said means for decoding comprises means for providing melodies as audible tone sequences in response to respective caller-identifying coded signals received on the user's line.

12. The system according to claim 9 wherein said means for decoding comprises:
    decoder means responsive to each received caller-identifying coded signal for providing respective decoded address signals representing the identified caller; and
    tune generator means for providing a plurality of audio tones as said melodies, each melody being provided in accordance with the particular decoded address signals.

13. The system according to claim 12 further comprising visual display means responsive to said decoded address signals for visually displaying an indication of the identity of the caller represented by the received coded identification signals.

14. A telephone privacy system for a telephone set user to identify and distinguish between authorized calling parties for calls received on the user's telephone line, said system comprising:
    ringing signal detection means responsive to plural sequential bursts of ringlng signal appearing on the user's line for permitting actuation of a ringing circuit in the user's telephone set in response to at least one of said bursts, and for placing the user's line in an off-hook status in response to a subsequent burst;
    entry request means responsive to said off-hook status for transmitting an entry request signal on the user's line to indicate to a calling party that a coded identification signal can be received and processed by said system;

means operative in the off-hook state for decoding caller-identifying coded signals appearing on the user's line; and indicator means responsive to said means for decoding for providing a humanly perceptible indication identifying an authorized calling party whose coded identification signal has been received on the user's line.

15. The system according to claim 14 wherein said indicator means comprises means for providing respective audible melodies representing each authorized caller whose coded identification signal has been received on the user's line, and for providing a further melody in response to failure to receive an authorized caller's coded identification signal within a predetermined time after said entry request signal has been transmitted on the user's line.

16. The system according to claim 15 wherein said entry request signal is a simulated audible ringing signal.

17. The system according to claim 16 further comprising means responsive to said means for decoding for visually displaying symbols identifying authorized callers whose coded identification signals have been received on the user's line.

18. The system according to claim 14 wherein said indicator means comprises means responsive to said means for decoding for visually displaying symbols identifying authorized callers whose coded identification signals have been received on the user's line.

19. The system according to claim 14 wherein said means for decoding comprises:

decoder means responsive to each received caller-identifying coded signal for providing respective decoded address signals representing the identified caller; and tune generator means for providing a plurality of audio tones as said melodies, each melody being provided in accordance with the particular decoded address signals.

* * * * *